(12) United States Patent
Levitt

(10) Patent No.: US 9,828,733 B2
(45) Date of Patent: Nov. 28, 2017

(54) PET WASTE COLLECTION APPARATUS

(71) Applicant: Jodie Levitt, Salt Lake City, UT (US)

(72) Inventor: Jodie Levitt, Salt Lake City, UT (US)

(73) Assignee: Jodie Levitt, Salt Lake City, UT (US)

( * ) Notice: Subject to any disclaimer, the term of this patent is extended or adjusted under 35 U.S.C. 154(b) by 0 days.

(21) Appl. No.: 15/289,155

(22) Filed: Oct. 8, 2016

(65) Prior Publication Data

US 2017/0101753 A1    Apr. 13, 2017

Related U.S. Application Data

(60) Provisional application No. 62/239,440, filed on Oct. 9, 2015.

(51) Int. Cl.
*A01K 29/00* (2006.01)
*E01H 1/12* (2006.01)
*A01K 27/00* (2006.01)

(52) U.S. Cl.
CPC ......... *E01H 1/1206* (2013.01); *A01K 27/008* (2013.01); *E01H 2001/1273* (2013.01); *E01H 2001/1286* (2013.01)

(58) Field of Classification Search
CPC .......... E01H 1/1206; E01H 2001/1273; E01H 2001/1286; B65D 83/0805; B65D 31/12; B65D 88/1668; B65D 31/00; B65D 33/01; A45C 11/20; A45C 11/008; A45F 5/004; A45F 3/005; A45F 3/00; A01K 1/0107; A01K 13/003; A01K 27/008

USPC ........................................................ D30/162
See application file for complete search history.

(56) References Cited

U.S. PATENT DOCUMENTS

| | | | |
|---|---|---|---|
| D319,804 S * | 9/1991 | Johnson | D10/15 |
| 5,447,227 A * | 9/1995 | Kosberg | A01K 1/035 |
| | | | 206/223 |
| 5,713,616 A * | 2/1998 | Knudson | E01H 1/1206 |
| | | | 206/223 |
| 6,199,737 B1 * | 3/2001 | Ringelstetter | E01H 1/1206 |
| | | | 150/108 |
| 6,257,473 B1 * | 7/2001 | Ringelstetter | E01H 1/1206 |
| | | | 119/795 |
| 6,309,775 B1 * | 10/2001 | Mank | H01M 4/32 |
| | | | 429/122 |
| 6,314,917 B1 | 11/2001 | Ryan | |
| 7,073,462 B1 * | 7/2006 | Layman | A01K 27/008 |
| | | | 119/161 |
| 7,931,170 B2 | 4/2011 | Che | |
| 8,505,770 B2 | 8/2013 | Askinasi | |
| 9,004,555 B1 * | 4/2015 | Chirico | E01H 1/1206 |
| | | | 206/223 |
| 9,049,910 B1 * | 6/2015 | Bakali | A45C 13/02 |
| 2009/0315350 A1 | 12/2009 | Allen | |
| 2010/0237640 A1 | 9/2010 | Chia | |

(Continued)

*Primary Examiner* — Stephen Vu

(57) ABSTRACT

A pet waste collection apparatus encloses an open-topped chamber with compartmentalized spaces for carrying waste bag dispenser and retaining filled pet waste bags. The apparatus is provided with openings for maintaining aeration. The waste bags are rolled out from a small side oval opening. The bag is provided with an attachment element to connect different types of attachments to attach the apparatus to a person's clothes or accessories or to a pet leash or directly with the pet.

8 Claims, 3 Drawing Sheets

(56) References Cited

U.S. PATENT DOCUMENTS

2011/0103193 A1* 5/2011 Jimenez ............... G04G 13/025
368/73

* cited by examiner

PET WASTE COLLECTION APPARATUS

CROSS REFERENCE TO RELATED APPLICATION

This application claims priority to U.S. Provisional Application No. 62/239,440 filed on Oct. 9, 2015, which is incorporated herein in its entirety by reference.

FIELD

The present disclosure relates to an animal waste collection apparatus.

BACKGROUND

Many cities and municipalities have enacted laws requiring domestic animal owners to restrain their pet animals particularly dogs, by having them attached to a leash, and, as well, to retrieve their fecal deposits. The pet owner is required to "cleanup" after their dogs so as to prevent others from stepping in or on the waste, and to inhibit the health risk associated with its presence.

The conventional technology provides devices for aiding pet owners with the odious and generally unpleasant task involved in collecting dog feces left by their pets. Not only are the tasks are difficult and odious the apparatus available for such use often is awkward to carry and to use. The prior art has suggested devices are difficult to carry and may not be easily employed without risking getting, the fecal material on his or her hands or apparel.

U.S. Pat. No. 7,931,170 B2 discloses a pet waste bag dispenser including a pouch body, a pouch cover, means for detachably attaching the pouch cover on the front wall of pouch body, and a bag dispenser for user's convenience.

U.S. Pat. No. 8,505,770 B2 discloses an animal waste bag dispenser wherein roll of waste bags with leading waste bag protruding from the center is inserted into a holder with an aperture on one end, and the holder is inserted into a plush animal with a second aperture aligned with first aperture so that the waste bags may be dispensed.

US 20100237640 A1 discloses a pet waste collection and temporary storage system, comprising a pet waste receptacle container and a leash clip.

U.S. Pat. No. 6,314,917 B1 discloses a retractable leash pack which is a compartmentalized pack made of typical back pack materials such as Nylon, webbing, mesh and VELCRO®—that fits securely to a retractable dog leash.

US 20090315350 A1 discloses a carrier that can be used to collect and transport items. The carrier may be used in connection with the pick-up and disposal of waste items, including but not limited to, animal waste.

It is therefore desirable to provide a convenient dispenser for plastic bags for collecting waste to be carried during walks. Additionally, it is desirable that such a device accommodate storage of waste bags when filled.

SUMMARY

The present disclosure provides an improved apparatus for storing pet's excreta in dispensable bag to be carried easily by the pet owner or the pet or attached to a pet leash. The general purpose of the present disclosure, which will be described subsequently in greater detail, is to provide a new pet waste collection apparatus for making waste to be more easily collected and carried. Further, the present disclosure provides a waste collection apparatus that can be comfortably and securely worn by a user or attached to a pet leash or worn by a pet, while taking the pets for walk.

In an example embodiment, the present disclosure provides an apparatus that can store accessories commonly carried by a user while taking his pet for a walk. Accordingly, the apparatus includes a pouch with separate compartments for roll of waste bags and storing the filled waste bag.

In an example embodiment the present disclosure provides as means for readily accessing the bags stored in the apparatus.

It is yet another example embodiment, the present disclosure provides a means for tethering the pet to the apparatus to allow the user to walk free when needed or desired.

In yet another example embodiment, the present disclosure provides a pet waste bag dispenser, so as to dispense rolls of waste bags.

Features and advantages of the present disclosure will be readily apparent to those of ordinary skill in the art upon reading of the following detailed description and embodiments of the present disclosure when taken in conjunction with the accompanying drawings. The inventive aspects of the disclosure are capable of being practiced and carried out in various ways. Also, it is to be understood that the phraseology and terminology employed herein are for the purpose of descriptions and should not be regarded as limiting.

BRIEF DESCRIPTION OF THE DRAWINGS

To further clarify various aspects of example embodiments of the present disclosure, a more particular description will be rendered by reference to specific embodiments thereof which are illustrated in the drawing. It is appreciated that the drawing depicts only illustrated embodiments of the disclosure and are therefore not to be considered limiting of its scope. The disclosure will be described and explained with additional specificity and detail through the use of the accompanying drawing in which.

DETAILED DESCRIPTION

Figure 2:
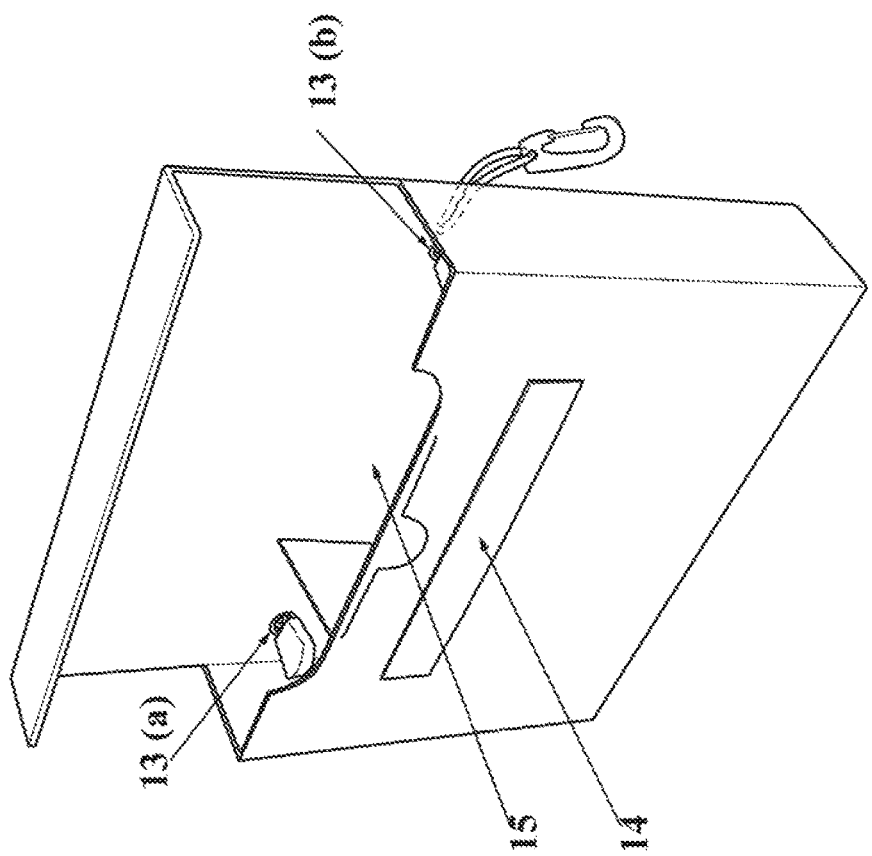
FIG. 2 shows another perspective view of the pet waste collection apparatus according to an example embodiment.

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

In the following description, reference is made to the accompanying drawings which form a part hereof, and in which is shown by way of illustration specific embodiments in which the inventive concept may be practiced. These embodiments are described in sufficient detail to enable those skilled in the art to practice the inventive concept, and it is to be understood that the embodiments may be combined, or that other embodiments may be utilized and that structural and logical changes may be made without departing from the spirit and scope of the present inventive concept. The following description is, therefore, not to be taken in a limiting, sense.

Example embodiments of the inventive concepts may be embodied in many different forms and should not be construed as being limited to the embodiments set forth herein, rather, these embodiments are provided so that this disclosure will be thorough and complete, and will fully convey the concept of example embodiments to those of ordinary skill in the art. In the drawings, some dimensions are exaggerated for clarity.

It will be understood that when an element is referred to as being "connected" or "coupled" to another element, it can be directly connected or coupled to the other element or intervening elements may be present.

The terminology used herein is for the purpose of describing particular embodiments only and is not intended to be limiting of example embodiments of the inventive concepts. As used herein, the singular forms "a," "an" and "the" are intended to include, the plural Rums as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

In some embodiments, the present disclosure provides improved pet waste collection apparatus to conveniently carry and store pet waste containing bags. The purpose of the disclosure is to provide user friendly, easy to use carry pet waste collection apparatus.

This section summarizes some aspects of the present disclosure and briefly introduces some embodiments. Simplifications or omissions in this section as well as in the abstract or the title of this description may be made to avoid obscuring the purpose of this section, the abstract and the title. Such simplifications or omissions are not intended to limit the scope of the present disclosure nor imply any limitations.

Figure 1:
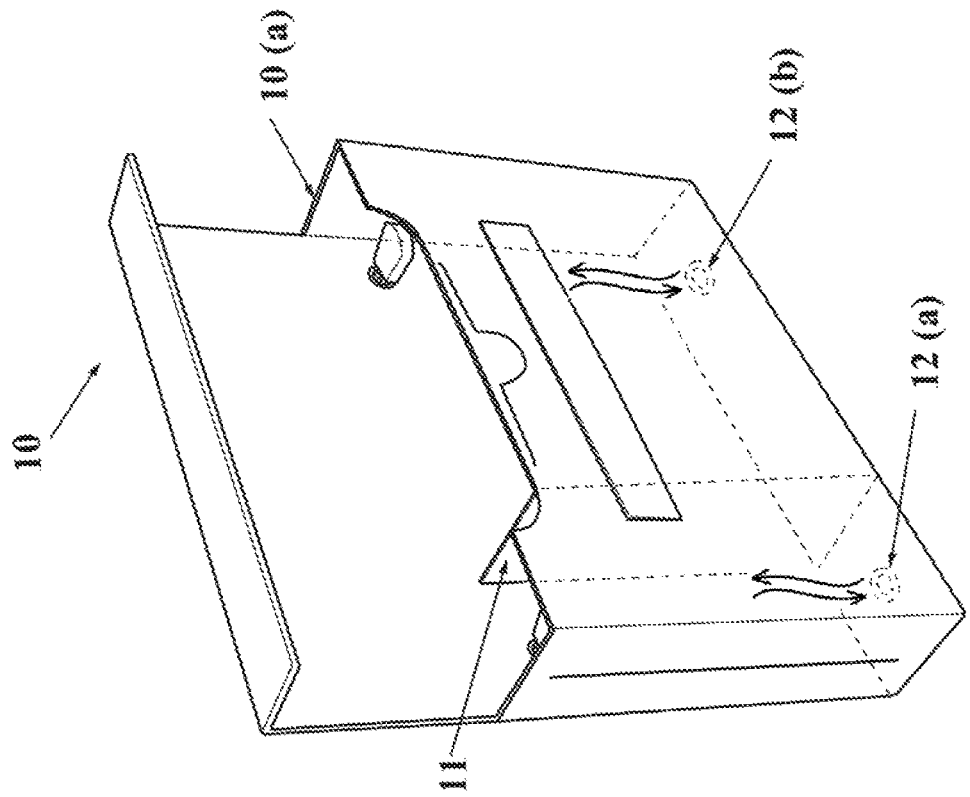
FIG. 1 shows a perspective view of a pet waste collection apparatus according to an example embodiment.

FIGS. 1-2 show a pet waste collection apparatus 10 which includes a receptacle 10(a) containing a simple collection pouch 15 that cart be used to carry pet waste in bags. The apparatus 10 includes a section 11, accessible from the outside to hold bags from a roll or singly inserted. The apparatus 10 includes aerating holes 12(a), 12(b) at the bottom of the receptacle to allow thorough aeration and keep odors away from the collector. The receptacle 10(a) is provided with attachment means or posterior rivets 13(a), 13(b) to allow for several transport attachments. Further, the receptacle 10(a) is provided with a light opaque stiff plastic with flap closure with hook and loop fasteners and pile seal to allow it to be resistant to the elements, and for simple cleaning. The flap includes top Velcro attachment to attach the flap with the Velcro 14 as shown in FIGS. 1-2.

In an example embodiment, the collection apparatus 10 may be a plastic bag enclosure.

The disclosed apparatus 10, as shown in FIGS. 1-2 provides an improved pet waste collection apparatus, by providing a bag like enclosure 10 with compartmentalized setup inside, a separate space 11 for carrying waste bag roll or individual waste bag. The rest of the space is used as a collection pouch 15 for carrying the used waste bag conveniently. The posterior rivets 13(a), 13(b) are provided for attaching several transport attachments with the bag 10 for easily carrying the bag 10 by a user, or for attaching to a pet leash or pet.

Figure 4:
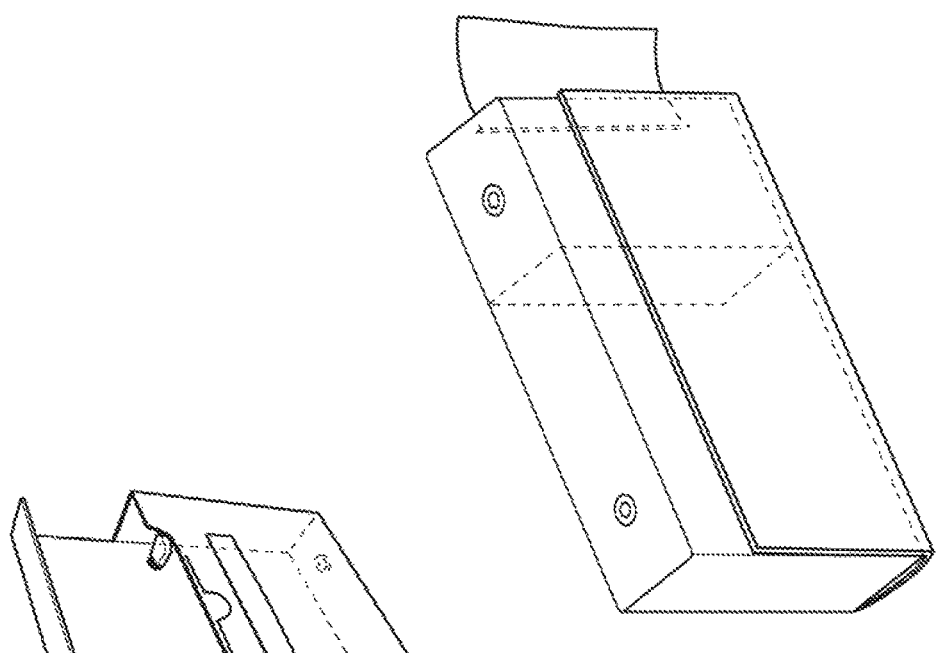
FIG. 4 shows a perspective view of the pet waste collection apparatus in a closed position according an example embodiment.
Figure 3:
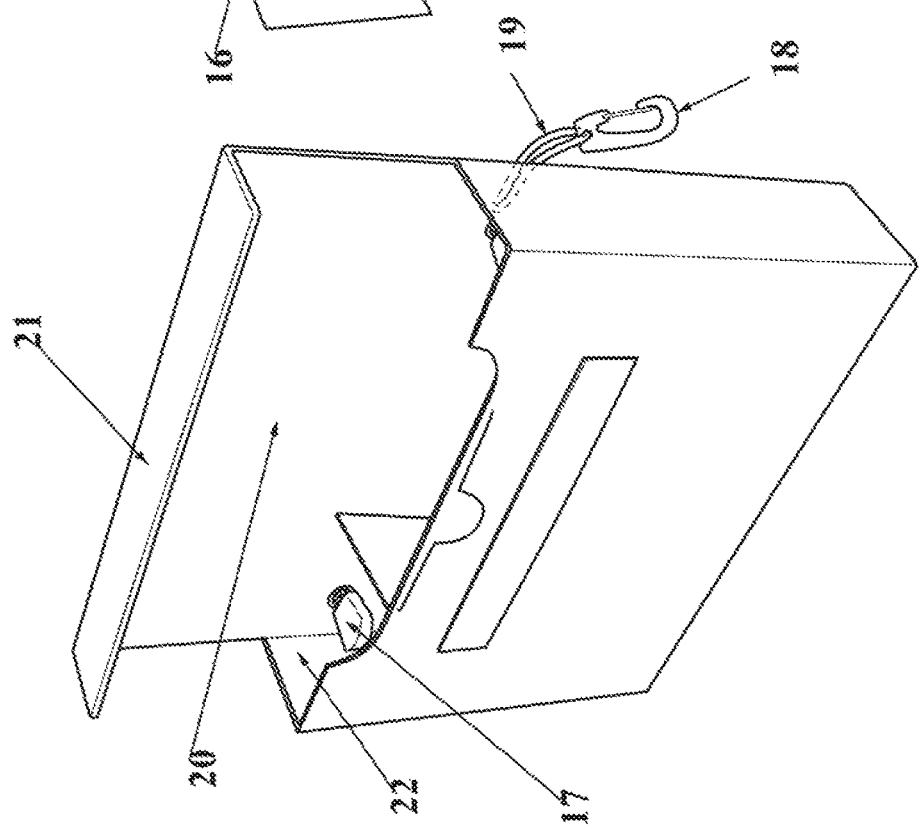
FIG. 3 shows another prospective view of the pet waste collection apparatus in an open position according to an example embodiment.
Figures 5A, 5B:
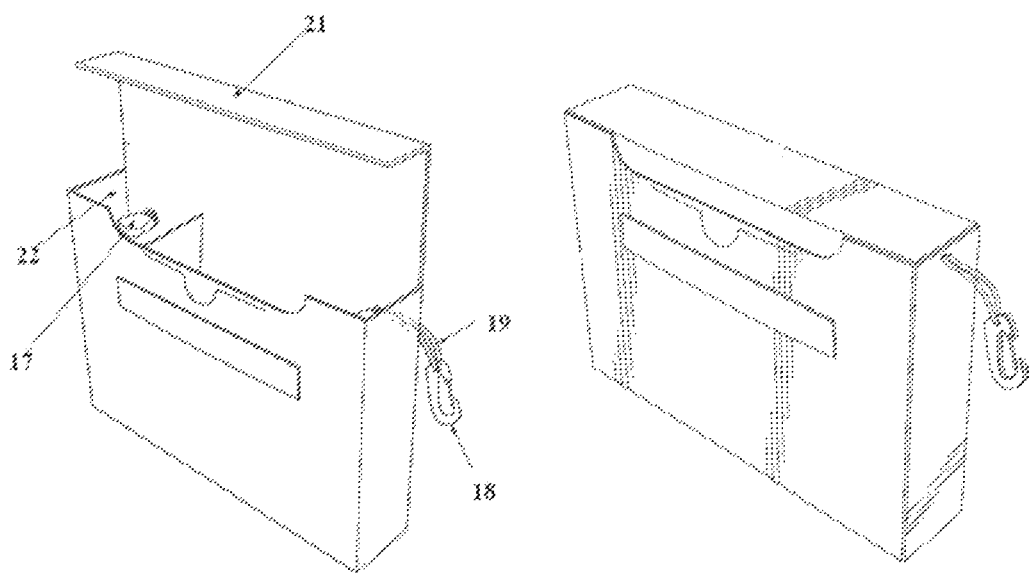
FIGS. 5a and 5b show a perspective view of the pet waste collection apparatus in open and closed positions side by side, according to an example embodiment.

The bag 10 includes an enclosure that constitutes various rivet positions within the enclosure, including a small opening 16 for easily accessing the space containing waste bag roll to roll out individual waste bag for collecting and carrying the pet's waste, as shown in open and closed view of the pet waste collection apparatus in FIGS. 3-4. The posterior rivets 13(a), 13(b) can be used for attaching various types of attachment means like a jacket pull type attachment to leash 17, or for clips 18. The belt clips 19 can also attach directly to pants or belt or backpack pockets as shown in FIG. 3.

In an example embodiment, the disclosed bag 10 is made in different sizes and specifications. In an example embodiment, the bag is 16 cm long, 10 cm high and 6 cm wide with a storage space 22 taking up to 5 cm wide internal portion from one side.

In another example embodiment, the bag ma be 15-19 cm long, 9-12 cm high and 5-8 cm wide bag with a storage space 22 taking up 5 cm wide internal portion from one side.

In some embodiments, the stiff opaque plastic is folded at corners and glued on inside to alleviate sharp corners and is provided with posterior open rivets to allow for interchangeable carrying options, interior open holes to allow for aeration and drainage if needed. It can further include a "zipper pull" type rope to thread through posterior rivets and plastic clips to allow for attachment to packs and leashes etc.

Accordingly, the invention provides a sanitary animal waste collection pouch for the collection and temporary storage of pet waste, said pouch having front, rear and opposite sides defining an open-topped chamber for receiving pet-waste containing tied plastic litter bags and having a flap cover carrying an exterior opening pocket and an interior opening pocket. The invention provides sanitary pet waste collection pouch for the collection and temporary storage of animal waste, said bag including an interior open-topped space for holding tied and sealed litter bags loaded with pet-wastes.

According to another embodiment, the pet waste bag dispenser is designed for the roll of rectangular shaped pet waste bags in such a manner that the pet waste bags can easily be dispensed continuously.

In another embodiment, the flap is provided for covering the top opening 20 of the bag storage space 15, so as to protect the pet waste bags disposed within the bag storage space 15 from the top opening 20 and to prevent the pet waste bags from falling off the bag storage space 15 or from damages. The flap has a front cover edge 21 extended from the rear side of the bag 10 for detachably attaching the front cover edge 21 of the bag 10 on the front side of the bag 10 via attachment means such as Velcro.

In order to ensure that the top opening 20 is to remain closed, the pet waste bag dispenser comprises the attachment means for detachably attaching the front cover edge 21 of the bag 10 on the front side of the bag 10, wherein the flap is front-wardly folded to cover the to opening 20 of the bag 10 so as to enclose the bag storage space 15 and retaining the pet waste in the bags therein. The apparatus 10 is also provided with an additional LCD clock/alarm on the top. The bag dispenser 22 is adapted for allowing the pet waste bags to be dispensed out of the bag storage space 11 when the bag 10 is enclosed such that the pet waste bags can be pulled out of the bag storage space 11 without having to use both hands to hold on to the pet waste bag dispenser or to have to open up the bag 10 to reach the pet waste bags, allowing a user to effortlessly utilize the pet waste bags, when he/she might not have both hands free as shown in FIG. 3.

Although specific embodiments have been illustrated and described herein, it will be appreciated by those of ordinary skill in the art that any arrangement, which is calculated to achieve the same purpose, may be substituted for the specific embodiment shown. This application is intended to cover an adaptations or variations of the present invention.

Although the invention has been explained in relation to its preferred embodiment, it is to be understood that many other possible modifications and variations can be made without departing from the spirit and scope of the invention.

I claim:

1. A pet waste collection apparatus comprising:
   a chamber including a plurality of compartmentalized spaces, the chamber further including a bottom side, a front side, a rear side, a left side, a right side, and a side opening, wherein the compartmentalized spaces comprise,
      a first compartmentalized space including a bag dispenser configured to dispense a plurality of bags, and a second compartmentalized space configured to carry and retain a pet waste wrapped in the bag;
   a venting rivet at the bottom side of each of the first and second compartmentalized spaces for air circulation;
   an attachment element at the rear side;
   a flap attached to a top side of the chamber and having hook and loop fasteners configured to close or open the chamber; and
   one or more posterior rivets at a posterior side of the chamber, the posterior rivets being configured to attach the apparatus to a user, a pet leash or to a pet.

2. The apparatus as claimed in claim 1, wherein the venting rivet allow a through aeration.

3. The apparatus as claimed in claim 1, wherein the attachment element is a jacket pull attachment to allow for a leash, a clip attachment or belt clips to attach to a person's clothing or accessories.

4. The apparatus as claimed in claim 1, wherein the flap is a folded and integrated flap configured to close the apparatus using a hook and loop fasteners for fast and easy attachment or detachment.

5. The apparatus as claimed in claim 1, wherein the flap is front-wardly folded to cover the plurality of compartmentalized spaces to retain the pet waste wrapped in the bags.

6. The apparatus as claimed in claim 1, wherein the bag dispenser comprises a side oval opening to allow easy access to the first compartmentalized space containing the bag dispenser to roll out individual bags for collecting and carrying the pet waste.

7. The apparatus as claimed in claim 1, wherein the apparatus is adapted to include an LCD clock and alarm.

8. The apparatus as claimed in claim 1, wherein the venting rivet is positioned in each of the first and second compartmentalized spaces such that separate air circulation is generated in each of the first and second compartmentalized spaces.

* * * * *